United States Patent
Teshima et al.

(10) Patent No.: US 6,234,377 B1
(45) Date of Patent: May 22, 2001

(54) BRAZING COMPOSITION FOR ALUMINUM MATERIAL, ALUMINUM MATERIAL FOR BRAZING, AND METHOD OF BRAZING ALUMINUM MATERIAL

(75) Inventors: Shoei Teshima, Handa; Koji Hirao, Tokai; Yuji Hisatomi, Kasugai; Hiroshi Ikeda, Nagoya, all of (JP)

(73) Assignees: Denso Corporation, Kariya; Sumitomo Light Metal Industries, Ltd., Tokyo, both of (JP)

( * ) Notice: Subject to any disclaimer, the term of this patent is extended or adjusted under 35 U.S.C. 154(b) by 0 days.

(21) Appl. No.: 09/343,423

(22) Filed: Jun. 30, 1999

(30) Foreign Application Priority Data

Jul. 7, 1998 (JP) .................................................. 10-191727

(51) Int. Cl.$^7$ .......................... B23K 31/02; B23K 20/00; B23K 35/12; B23K 35/34
(52) U.S. Cl. ....................... 228/183; 228/24; 228/252.51; 148/24
(58) Field of Search ............................... 148/24; 427/428; 428/654; 228/252.51, 183

(56) References Cited

U.S. PATENT DOCUMENTS 4,194,040 * 3/1980 Breton et al. ......................... 428/308
5,785,770 * 7/1998 Meshri et al. ......................... 148/26

FOREIGN PATENT DOCUMENTS

62282799 * 12/1987 (JP) .
41092848 * 4/1999 (JP) .

* cited by examiner

Primary Examiner—Clifford C. Shaw
Assistant Examiner—Zidia Pittman
(74) Attorney, Agent, or Firm—Flynn, Thiel, Boutell & Tanis, P.C.

(57) ABSTRACT

A brazing composition for aluminum materials capable of functioning as a flux and a brazing material with a single component and providing a solid brazed joint exhibiting little local fusion. The brazing composition for aluminum materials which has the function of removing the oxide film on the surface of the aluminum material to be joined at a temperature lower than the melting point of the aluminum material and forming a eutectic aluminum alloy braze which fuses at such a low temperature by reaction with the aluminum materials, wherein the brazing composition comprises a first powder comprising at least one or more M—Si—F compounds comprising, in addition to at least Si and F, hydrogen or an alkaline metal or hydrates thereof or comprises this first powder as an component.

9 Claims, No Drawings

BRAZING COMPOSITION FOR ALUMINUM MATERIAL, ALUMINUM MATERIAL FOR BRAZING, AND METHOD OF BRAZING ALUMINUM MATERIAL

BACKGROUND OF THE INVENTION

1. Field of the Invention

The present invention relates to a brazing composition for aluminum materials, an aluminum material for brazing, and a method of brazing an aluminum material. More particularly, the present invention relates to brazing of aluminum materials comprising aluminum or aluminum alloys corresponding to brazing using an anticorrosive flux.

2. Description of the Background Art

Brazed products prepared by assembling aluminum materials or parts and brazing them have been widely used for heat exchangers such as automotive heat exchangers because of their lightweight and high conductivity. In the manufacture of such brazed products, various brazing methods are employed today, which are roughly divided into a flux brazing method and a vacuum brazing method. Among the brazing using a flux, brazing using an anticorrosive flux is in the mainstream, in which a compound containing fluorine (F), for example, fluorine compounds such as KF, $AlF_3$, $KAlF_4$, $K_2AlF_5$, $K_3AlF_6$, CsF, RbF, LiF, NaF, and $CaF_2$, a mixture of these compounds, or fused and solidified products of these compounds is used as the main component.

In this brazing method, the flux is applied to a brazing material made of Al—Si alloys and heated to remove an oxide film on the surface of the aluminum materials to be joined. At the same time, the brazing material and the aluminum materials are provided with wettability to join the aluminum materials. As the brazing materials used in the above brazing using an anticorrosive flux, a brazing sheet comprising aluminum or aluminum alloys as a core material with brazing alloys such as Al—Si alloys clad on both sides or one side of the core material is used. Such a brazing sheet is manufactured by joining the core material and the brazing alloys by hot rolling and spreading to a predetermined thickness by cold rolling. This makes the manufacturing process complicated and increases the number of the manufacturing steps, thereby increasing the material costs. Moreover, since the brazing material contains hard Si, the molding cost also increases. Furthermore, in the manufacture of aluminum-made heat exchangers using such a brazing sheet, a step of applying an anticorrosive flux before heating for brazing further increases the cost.

In order to solve these problems of the prior art, a method which comprises applying a brazing composition comprising a mixture of metal Si powder and an anticorrosive flux to aluminum materials, assembling the aluminum material and the other material to be joined, and heating these aluminum materials to braze them without using a brazing sheet has been proposed (U.S. Pat. No. 5,100,048, U.S. Pat. No. 5,190,596, Publication of Translation of International Patent Application No. 504485/1994). This method uses a mixture of metal Si powder or other metal powders which form a eutectic alloy with aluminum, and a flux powder which removes an oxide film as the brazing composition. The mixture is applied to the aluminum materials to be joined and heated while the metal Si powder or other metal powders which form a eutectic alloy with aluminum in the mixture is in contact with the aluminum surfaces to diffuse Si and the like in the aluminum material and create a state similar to a eutectic structure of eutectic alloys such as Al—Si alloys with the aluminum components to join the aluminum materials.

However, in this method, the metal powder which forms a eutectic alloy with aluminum, such as a metal Si powder used as a component of the mixture, is relatively expensive. Moreover, the powder grinding operation for preparing the metal powder to a predetermined particle size is difficult because of its hardness, thereby increasing the manufacturing cost.

If a small amount of the metal powder (Si) having a large particle size is included in the mixture, such a metal powder fuses the aluminum material that is a base metal during the steps from heating to cooling for brazing to cause a large amount of local fusion. This brings about problems in the resulting brazed products. For example, in the case of heat exchangers, the necessary characteristics such as pressure resistance and corrosion resistance may be impaired. In the case of brazing parts which require a large amount of a brazing composition, if the mixture of the brazing composition is applied thickly, the metal (Si) does not react with the aluminum components in the aluminum material and remains as a black residue.

SUMMARY OF THE INVENTION

In view of the above situation of the prior art, the present inventors have conducted extensive studies of brazing using an anticorrosive flux. As a result, the present inventors have discovered that a specific compound comprising, in addition to at least F and Si, hydrogen or an alkaline metal or hydrates thereof can function as a flux which removes an oxide film which is present on the surface of the aluminum materials and hinders the joining of the aluminum materials by the reaction with the aluminum material at a temperature lower than the melting point of the aluminum material to be joined, and can function as a brazing material which forms a eutectic aluminum alloy braze which fuses at such a low temperature and integrally joins the aluminum materials by the subsequent cooling. The present invention has been completed on the basis of this finding.

Accordingly, an object of the present invention is to provide a brazing composition for aluminum materials wherein a single component can function as a flux and a brazing material (differing from a conventional brazing composition comprising a flux and a brazing material in combination) to provide a solid brazed joint exhibiting little local fusion, an aluminum material for brazing using the brazing composition, and a method of manufacturing the same, and a method of brazing aluminum materials using the brazing composition.

In order to achieve the above object, the present invention provides a brazing composition which has the function of removing the oxide film on the surface of the aluminum material to be joined at a temperature lower than the melting point of the aluminum material and forming a eutectic aluminum alloy braze which fuses at such a low temperature by the reaction with the aluminum materials, wherein the brazing composition comprises a first powder which comprises at least one or more M-Si-F compounds comprising, in addition to at least Si and F, hydrogen or an alkaline metal or hydrates thereof, or comprises this first powder as a major component and other components. Specifically, according to the brazing composition of the present invention, the compound comprising, in addition to at least F (fluorine) and Si (silicon), hydrogen or an alkaline metal or hydrates thereof reacts with the aluminum materials (the surface of the aluminum material) to be joined at a temperature lower than the melting point of the aluminum materials to decompose into two or more compounds having the function of effectively removing the oxide film on the surface of the aluminum material which hinders joining of the aluminum materials and forming a eutectic aluminum alloy braze as a brazing material to form an integrally brazed joint by subsequent cooling. According to the brazing composition of the present invention, because a layer of the flux which removes the oxide film and a layer which forms a eutectic aluminum alloy braze and forms the brazed joint as a brazing material are formed on the surface of the aluminum material at a temperature slightly lower than the brazing temperature, local fusion on the brazed area of the aluminum material after brazing can be prevented.

Since the brazing composition of the present invention functions as both the flux and brazing material, there is no need to use either the mixture prepared by selecting the brazing material and flux and mixing these components or a brazing sheet, as in a conventional method. Moreover, the surface of the aluminum material where the aluminum material and the brazing composition has reacted exhibits little local fusion.

Furthermore, the powder of the above specific M—Si—F compounds or the hydrates thereof which constitute the brazing composition of the present invention can be easily ground in comparison with a conventionally used hard Si powder. Because of this, local fusion due to the large particle size of the powders can be effectively prevented. According to the brazing composition of the present invention, if a powder of a large particle size is used, since local fusion is effectively controlled by the properties of the compound which provides such a powder, a solid brazed joint exhibiting little local fusion can be advantageously obtained.

According to a preferred embodiment of the brazing composition for aluminum materials of the present invention, the first powder of the brazing composition comprises at least one or more M—Si—F compounds or hydrates thereof so that the weight ratio of M:Si:F: is 5–50%:5–50%:20–80% (wherein M represents hydrogen or an alkaline metal, provided that the sum of M, Si, and F is 100%). In the present invention, hexafluorosilicic acid or alkaline metal salts thereof, in particular, potassium hexafluorosilicate or sodium hexafluorosilicate is advantageously used as the M—Si—F compound.

According to another preferred embodiment of the present invention, the brazing composition of the present invention comprises 50 wt % or more of at least one or more of hexafluorosilicic acid, an alkaline metal salt thereof, or hydrates of these compounds as the first powder comprising one or more M—Si—F compounds or hydrates thereof and, in the remaining proportion, second powders comprising at least one or more powders selected from the group consisting of metal powders consisting of Al, Si, Cu, Zn, Ge, Sr, or Bi, alloy powders of at least one of these metals and aluminum, oxides or fluorides of these metals, alkaline metal salts of silicic acid or hydrates thereof, hexafluorosilicate (excluding alkaline metal salt) or hydrates thereof, a brazing flux comprising 20–45% of K, 10–25% of Al, and 45–70% of F in an elemental proportion, and a fluoride flux. In the combination of the first and second powders, potassium hexafluorosilicate or sodium hexafluorosilicate is advantageously used as the alkaline metal salt of hexafluorosilicic acid.

When applying the brazing composition of the present invention to the aluminum materials to be joined, the brazing composition is dispersed in a volatile solvent or water in slurry form and used as a brazing coating. Particularly, it is preferable that a resin which disperses and disappears at 550° C. or lower and does not hinder brazing properties be added to such a brazing coating. The addition of such a resin improves properties such as uniformity of the coated surface and adhesion of the coating.

The present invention further provides a method of manufacturing aluminum materials for brazing which comprises coating the above brazing coating on the surface of the aluminum materials to be joined by a roll transfer method to form a layer of the brazing composition. The present invention also provides an aluminum material for brazing prepared by the above manufacturing method and the like, specifically, an aluminum material for brazing which comprises a coating layer of the brazing composition of the present invention applied to the surface of the aluminum material to be joined. This coating layer advantageously comprises 1–50 g/m$^2$ of Si in the first powder comprising one or more M—Si—F compounds or hydrates thereof in the brazing composition. The present invention provides a method of brazing aluminum materials which comprises applying the brazing composition of the present invention to two aluminum materials at least in the joined areas, heating the aluminum materials to remove the oxide film on the joined surfaces of the aluminum materials with the brazing composition, and forming a eutectic aluminum alloy braze by the reaction of the brazing composition and the aluminum materials to braze the aluminum materials into an integrated product. According to the method of brazing aluminum materials of the present invention, since a specific M—Si—F compound which constitutes the brazing composition functions as both the flux and brazing material, aluminum materials can be brazed using such a single component. Therefore, there is no need to separately select the components for the brazing material and flux and mix these components in the preparation of the brazing composition, thereby effectively reducing the cost for the materials and advantageously simplifying the manufacturing process.

DETAILED DESCRIPTION OF THE INVENTION AND PREFERRED EMBODIMENT

According to the brazing composition for aluminum materials of the present invention, a first powder comprising at least one or more M—Si—F compounds which comprise, in addition to at least Si (silicon) and F (fluorine), hydrogen or an alkaline metal or hydrate thereof is used as the constituent component or one of the components. In brazing the materials made of aluminum or aluminum alloys, the first powder forms a flux layer which removes the oxide film and a layer which functions as a brazing material for forming a brazed joint by forming a eutectic aluminum alloy braze on the surface of the aluminum material at a temperature lower than the melting point of the aluminum material to be joined. Because of this, the first powder removes the oxide film on the surface of the aluminum material as a flux and forms a eutectic aluminum alloy braze which fuses at such a low temperature to advantageously achieve the object of the present invention.

As the first powder comprising at least one or more specific M—Si—F compounds or hydrates thereof, a compound prepared so that the weight ratio of M (hydrogen or an alkaline metal):Si (silicon):F (fluorine) in the compound is 5–50%:5–50%:20–80% (wherein M+Si+F=100%) is advantageously used. Although a composition in which the weight ratios of M and F are less than 5% and more than 80%, respectively causes no problem in brazing, use of a large amount of F which removes the oxide film increase the manufacturing cost. Moreover, plate crystals of the flux excessively adsorb to the surface of the aluminum material and remain as a residue, thereby impairing the appearance as well as uniformity of the surface treatment after the flux brazing. If the weight ratios of M and F are more than 50% and less than 20%, respectively, the amount of F for removing the oxide film is insufficient, thereby resulting in inferior joining. Moreover, because of the insufficient fusion of Si which can form a eutectic with the surface of the aluminum materials, residues of Si which do not fuse remain in the non-joint areas. If the weight ratios of Si is less than 5%, the use of a large amount of F which removes the oxide film increases the manufacturing cost. Moreover, plate crystals of the flux are excessively adsorbed to the surface of the aluminum materials and remain as a residue, thereby impairing the appearance as well as uniformity of the surface treatment after the flux brazing. If the weight ratio of Si is more than 50%, because of insufficient fusion of the Si which can form a eutectic with the surface of the aluminum material, residues of Si which do not fuse remain in the non-joint areas.

In the present invention, as examples of the above M—Si—F compounds, hexafluorosilicic acid ($H_2SiF_6$) or alkaline metal salts thereof can be used. Specific examples include $Li_2SiF_6$, $Na_2SiF_6$, $K_2SiF_6$, $Cs_2SiF_6$, $Rb_2SiF_6$, and $H_2SiF_6$. Of these, potassium hexafluorosilicate ($K_2SiF_6$) and sodium hexafluorosilicate ($Na_2SiF_6$) are advantageously used. The above hexafluorosilicic acid or alkaline metal salts thereof can be used as a hydrate such as $H_2SiF_2.2H_2O$ and $Li_2SiF_6.2H_2O$.

The brazing composition of the present invention comprises only the first powder which comprises at least one or more M—Si—F compounds or hydrates thereof or comprises 50 wt % or more of the first powder as the major component and other components. As the above other components (subcomponent: second powder) which are used in combination with the first powder, various known components are used in order to improve the characteristics of the brazed part and the like. This subcomponent (second powder) comprises at least one or more compounds selected from the group consisting of metal powders such as Al, Si, Cu, Zn, Ge, Sr, or Bi, alloy powders of at least one of these metals and aluminum, oxides or fluorides of these metals, an alkaline metal salt of silicic acid or hydrates thereof, hexafluorosilicate (excluding the alkaline metal salt) or hydrates thereof, brazing flux comprising 20–45% of K, 10–25% of Al, and 45–70% of F in an elemental proportion, and fluoride flux. The second powder is used in the remaining proportion (less than 50 wt %) in addition to 50 wt % or more of the first powder in the brazing composition. The addition of the second powder as the subcomponent improves joining properties, provides corrosion resistance, sacrificial anode effect, effective brazing at a low temperature, and the like.

Specifically, for example, Si (metal), Al—Si alloy, $SiO_2$, other Si alloys, or a compound containing Si mainly ensures and adjusts the brazing material necessary for the fillet which is formed on the brazed joint. Zn, Al—Zn alloys, $ZnF_2.4H_2O$, other Zn alloys or a compound containing Zn adjusts the potential difference between the joined members to ensure the sacrificial anode effect. Cu, Al—Cu alloys, $Cu_2O$, $CuF_2.2H_2O$, other Cu alloys, or a compound containing Cu mainly improves the hardness of the joined members. Ge, Al—Ge alloys, $GeO_2$, other Ge alloys, or a compound containing Ge mainly lowers the reaction temperature with the aluminum materials to control the brazing temperature. Sr, SrF, Al—Sr alloys, Bi, Al—Bi alloys, $Bi_2O_3$, other Bi or Sr alloys, or a compound containing Bi or Sr mainly improves the fluidity of the braze to promote brazing properties. Al, $Al_2O_3$, $AlF_3$, other Al alloys, or a compound containing Al controls the degree of reaction and fusion with the aluminum base metal, adjusts the melting point of the flux, and the like. Hexafluorosilicates such as $BaSiF_6$, $CaSiF_6$, $SrSiF_6$, $ZnSiF_6$ or hydrates thereof, KF, $AlF_3$, $KAlF_4$, $K_2AlF_5$, $K_3AlF_6$, CsF, RbF, LiF, NaF, $CaF_2$, a mixture of two or more of these compounds, or a composition obtained by fusing and solidifying these compounds adjusts the melting point of the flux for removing the oxide film or the melting point of the flux while maintaining the amount of brazing fusion. Alkaline metal salts of silicic acid such as $Na_2SiO_3$, $Li_2SiO_3$, and $K_2SiO_3$ or hydrates thereof contribute to the formation of the brazing material. As described above, in the brazing composition of the present invention, various metals or compounds are optionally blended as the subcomponent (second powder) in an appropriate amount in addition to the first powder as the essential component.

In the present invention, substances which improve the object of the present invention other than the substances described above, for example, a substance which diffuses or fuses in the aluminum materials by reacting with the aluminum material, or provides the brazed product with desired characteristics by reacting with the flux upon heating for brazing can be used in the brazing composition in combination with the first powder.

As the aluminum material to which the brazing composition of the present invention is applied, various materials such as a plate or extruded materials comprising aluminum or aluminum alloys, and molded products or assembled products thereof are used. A layer of the brazing composition is formed to a predetermined thickness on various aluminum materials such as aluminum raw materials, processed products, and assembled products according to techniques described below. The brazing composition of the present invention is applied to the aluminum materials made of aluminum or aluminum alloys having a desired shape according to a conventional technique. The brazing composition is generally prepared in slurry form by dispersing the composition in a volatile solvent or water to be used as a brazing coating having a function of a brazing flux and a function of forming a eutectic aluminum alloy braze which fuses at a low temperature as described above and applied to the objective aluminum materials. Use of such a coating improves the uniformity of the coating on the surface of the aluminum material, ensures multiplication and simplicity of the coating method advantageously, and improves properties such as adhesion of the coating. In the present invention, in order to ensure these effects, a brazing coating comprising the brazing composition prepared in slurry form in a volatile solvent or water and a resin which decomposes and disappears at 550° C. or lower and does not hinder brazing properties is advantageously used. As water which is used in the preparation of this brazing coating, since impurities contained in water hinder brazing properties, use of pure water is preferable. As the above volatile solvent, conventionally known solvents are appropriately selected according to the desired thickness of the coating, degree of surface roughness (uniformity), and the like for each constituent member of the brazed product such as heat exchangers. Of these, organic solvents such as propanol, 2-propanol, butanol, toluene, xylene, and ethylbenzene are advantageously used.

The brazing composition is prepared in slurry form in such a volatile solvent or water as the brazing coating so that the solid weight ratio is 50% or more. As the resin which is added to the brazing coating, resins which completely volatilize or disappear at a brazing temperature or less, in particular, at the fusing temperature or less of the brazing material are used in order to prevent the brazing properties from being hindered. Resins which can decompose and disappear at 550° C. or lower and do not hinder the brazing properties are generally used. As examples of such resins, homopolymers or copolymers prepared by polymerizing one monomer or two or more monomers such as methyl methacrylate, ethyl methacrylate, n-butyl methacrylate, 2-ethylhexyl methacrylate, and propyl methacrylate, copolymers of these monomers and other vinyl monomers, and the like can be given. These resins are appropriately selected according to the desired characteristics such as coating thickness and surface uniformity (degree of surface roughness) in combination with the types of the dispersion medium (solvent or water). The weight ratio of the resin used in the coating is preferably 50% or less, since use of the resin in a too large an amount increases the cost and the like.

According to the present invention, the objective aluminum material for brazing is manufactured by applying the above brazing coating to at least the joined surface of the aluminum material made of aluminum or aluminum alloys using a conventional method to form the coating layer of the brazing composition. In the manufacture of the aluminum material for brazing, conventional methods such as spray coating, immersion coating, and roll transfer coating (roll coating) are appropriately adopted for continuously applying the brazing coating to the surface of the aluminum materials. Since a spray gun sometimes clogs during the spray coating and stability of the coating sometimes becomes inferior during immersion in the immersion method, the roll transfer method which exhibits superior coating stability and superior processability is adopted as a preferable coating method in the present invention. In roll transfer coating, coating conditions such as materials for the surface of the roller and the forward or reverse rotation of a coating roller and an application roller are appropriately determined according to the desired coating thickness, surface uniformity (degree of surface roughness), and the like. The roll transfer conditions suitable for the object are appropriately selected.

The coating layer comprising the brazing composition of the present invention is formed to a predetermined thickness on the joined surface of the aluminum materials for the brazing thus obtained. Such a coating layer is generally formed to a thickness so that the Si in the first powder comprising one or more M—Si—F compounds or hydrates thereof in the brazing composition is contained in a ratio of 1–50 g/m$^2$. If the Si content (Si-reduced value) in the coating layer is too small, although the aluminum materials can be joined, fused brazing materials cannot form an effective fillet, whereby the brazed product exhibits insufficient performance, or the hardness of the brazed joint becomes inferior. If the Si content of the coating layer is too large, fusion and corrosion caused by the fillet formed at the joint of the base metal are significant, thereby impairing brazing properties, corrosion resistance, and the like .

According to the aluminum material for brazing of the present invention, the thickness of the coating layer comprising the brazing composition formed on the surface of the aluminum material is appropriately determined in the range of the above Si-reduced values (1–50 g/m$^2$) corresponding to the functions of each constituent material of the objective brazed product, namely, the desired amount of the fillet at the joint. As the coating layer having a larger Si-reduced value (thicker coating) is formed, the fillet formed at the joint becomes bigger. For example, in the case of a fin for a heat exchanger, the coating layer having a Si-reduced value in the range from 1–20 g/m$^2$ is preferable. In the case of a tube used as a refrigerant circulator of a heat exchanger, a coating layer in the range from 2–30 g/m$^2$ is preferable. In the case of a tank formed at an entrance of a heat exchanger which connects the refrigerant circulators, a coating layer in the range from 5–50 g/m$^2$ is preferable.

The present invention exhibits superior characteristics when brazing aluminum materials using the brazing composition or the aluminum material thus obtained in comparison to conventional brazing using an anticorrosive flux. Specifically, the present invention comprises applying the brazing composition to at least the joined surfaces of the aluminum materials and heating the composition and the aluminum materials to remove the oxide film present on the surface of the joined areas of the aluminum materials and the brazing composition, and forming a eutectic aluminum alloy braze by the reaction of the brazing composition and the aluminum material to braze these aluminum materials to an integral joined product (brazed product), whereby a solid brazed joint can be easily formed. In this brazing method, the brazing composition is applied to at least one of the joined surfaces of two aluminum materials as the coating layer and the like. The aluminum materials are assembled (attached) to the objective joint form in the presence of the brazing composition. The aluminum materials are heated at a temperature lower than the melting point of these aluminum materials, generally at 580–620° C., to react the brazing composition and the surfaces of the aluminum materials. By this reaction, the oxide film which is present on the surfaces of the aluminum materials and hinders the joining is removed and a eutectic aluminum alloy braze which fuses at such a temperature is formed. The aluminum materials are then cooled to obtain the brazed product of two aluminum materials.

EXAMPLES

The present invention will now be described in more detail by way of examples below, which should not be construed as limiting the present invention. It should be clearly understood that numerous modifications, amendments, and variations of the present invention other than the following Examples and as specifically described herein are possible on the basis of the knowledge of a person who is skilled in the art.

Example 1

Various aluminum materials for brazing shown in Table 1 were prepared. Specifically, various brazing coatings in slurry form were prepared by mixing brazing compositions of the Examples shown in Table 1 with the same weight of purified water. Coating layers comprising various brazing compositions having a Si-reduced coating weight shown in Table 1 were applied to one side of the surface of a first aluminum sheet (material: A3003, thermally refined O-type, thickness: 1.0 mm, width: 25 mm, length: 60 mm) using a bar coater to obtain first aluminum sheets as the aluminum materials for brazing.

In the preparation of the brazing compositions, powders having an average particle diameter of about 30 μm were used in Nos. 1–6 and Nos. 11–16. In No. 7 and No. 8, powders having an average particle diameter of about 20 μm were used. In No. 9 and No. 10, powders having an average particle diameter of about 60 μm were used. The mixing ratio of $KAlF_4:K_3AlF_6$ was 1:1.

TABLE 1

| No. | Brazing composition Component | Content (wt %) | Content (wt %) M | Si | F | Si-reduced coating weight (g/m²) |
|---|---|---|---|---|---|---|
| Example | | | | | | |
| 1 | $Na_2SiF_6$ | 100 | 24 | 15 | 61 | 2 |
| 2 | $Na_2SiF_6$ | 100 | 24 | 15 | 61 | 45 |
| 3 | $K_2SiF_6$ | 100 | 35 | 13 | 52 | 2 |
| 4 | $K_2SiF_6$ | 100 | 35 | 13 | 52 | 45 |
| 5 | $K_2SiF_6/Na_2SiF_6$ | 50/50 | 30 | 14 | 56 | 2 |
| 6 | $K_2SiF_6/Na_2SiF_6$ | 50/50 | 30 | 14 | 56 | 45 |
| Comparative Example | | | | | | |
| 7 | $Si/(KAlF_4 + K_3AlF_6)$ | 33/67 | 30 | 33 | 37 | 2 |
| 8 | $Si/(KAlF_1 + K_3AlF_6)$ | 33/67 | 30 | 33 | 37 | 45 |
| 9 | $ZnSiF_6 \cdot 4 H_2O$ | 100 | — | 19 | 81 | 2 |
| 10 | $ZnSiF_6 \cdot 4 H_2O$ | 100 | — | 19 | 81 | 45 |
| 11 | $Na_2SiF_6$ | 100 | 24 | 15 | 61 | 0.5 |
| 12 | $Na_2SiF_6$ | 100 | 24 | 15 | 61 | 55 |
| 13 | $K_2SiF_6$ | 100 | 35 | 13 | 52 | 0.5 |
| 14 | $K_2SiF_6$ | 100 | 35 | 13 | 52 | 55 |
| 15 | $K_2SiF_6/Na_2SiF_6$ | 50/50 | 30 | 14 | 56 | 0.5 |
| 16 | $K_2SiF_6/Na_2SiF_6$ | 50/50 | 30 | 14 | 56 | 55 |

The first aluminum sheet was placed as a horizontal plate so that the coating layer of the brazing composition is the upper side. A second aluminum sheet (material: A3003, thermally refined O-type, thickness: 1.0 mm, width: 25 mm, length: 55 mm) was assembled as a vertical plate on the first aluminum sheets into a T shape and secured with a jig. This assembled material consisting of the first and second aluminum sheets was put into a brazing oven maintained at an oxygen concentration of 100 ppm or below and a dew point of −30° C. or below in a nitrogen atmosphere and heated at 600° C. for 3 minutes for brazing. After cooling to 500° C. or below in the oven, the assembled material secured with a jig was taken out to obtain various samples in which the first and second aluminum sheets were brazed into a T-shape.

The size of the fillet and appearance of the surfaces of the samples thus obtained were evaluated by naked eye observation. The rate of the fillet formed at the joint (joining rate), the corrosion depth of the joint, and the maximum fusion depth of the non-joint areas were measured. The results are shown in Table 2.

The joining rate (%) used herein is determined by (length of the fillet formed at the joint/length where the horizontal plate and the vertical plate joined (length of joint)). The corrosion depth of the fillet at the joint and the maximum fusion depth of the non-joint areas were determined by measuring the area where the deepest fusion of the base metal due to the corrosion of the brazing material was observed by using enlarged sectional microphotography.

TABLE 2

| No. | Evaluation results Corrosion depth at joint | Size of fillet | Joining rate (%) | Maximum fusion depth at non-joint area (μm) | Appearance |
|---|---|---|---|---|---|
| Example | | | | | |
| 1 | Shallow | Small | 100 | 15 | Good |
| 2 | Shallow | Large | 100 | 45 | Good |
| 3 | Shallow | Small | 100 | 16 | Good |
| 4 | Shallow | Large | 100 | 42 | Good |
| 5 | Shallow | Small | 100 | 14 | Good |
| 6 | Shallow | Large | 100 | 41 | Good |
| Comparative Example | | | | | |
| 7 | Shallow | Small | 100 | 52 | Good |
| 8 | Deep | Large | 100 | 104 | Great quantity of residue(S) |
| 9 | | | 0 | | Great quantity of residue |
| 10 | | | 0 | | Great quantity of residue |
| 11 | None | None | 100 | 11 | Good |
| 12 | Excessive | Excessive | 100 | 62 | Great quantity of residue(F) |
| 13 | None | None | 100 | 12 | Good |
| 14 | Excessive | Excessive | 100 | 69 | Great quantity of residue(F) |
| 15 | None | None | 100 | 16 | Good |
| 16 | Excessive | Excessive | 100 | 58 | Great quantity of residue(F) |

Note:
(S): Black (brown) residue due to Si
(F): Excessive crystalline residue of flux powder As is clear from the results shown in Table 2, in Nos. 1–6, are the Examples of the present invention, the fillet was effectively formed, showing effective brazing of the aluminum materials with a small corrosion depth in the joint area. In addition, the maximum fusion depth of the non-joint area was also small (less than 50 μm), and corrosion due to the residue on the surface was scarcely observed. On the other hand, in No. 7 which is the Comparative Example, the non-joint area exhibited a large value for the maximum fusion depth. In No. 8, the non-joint area exhibited a large value for the maximum fusion depth and brown residue was observed on the surface. In No. 9 and No. 10 in which the brazing composition comprises, in addition to F and Si, metal components other than hydrogen or an alkaline metal, the aluminum materials could not be brazed. In Nos. 11, 13, and 15, the fillet was not formed though the aluminum materials were joined. In Nos. 12, 14, 16, though brazing with a joining rate of 100% was achieved, the non-joint area exhibited a large value for the maximum fusion depth and a great quantity of flux residue was observed on the surface.

Example 2

Using various brazing compositions comprising mixed powders shown in Tables 3 and 4, brazing properties of the aluminum materials were evaluated. Each brazing composition was applied so that the Si-reduced coating weight in $K_2SiF_6$, which is the constituent component, was about 10 g/m². The brazing operations and evaluation of the brazed joint were conducted in the same manner as in Example 1. The results are shown in Tables 5 and 6.

TABLE 3

Brazing composition

| No. | Component | Content (wt %) |
|---|---|---|
| 17 | $K_2SiF_6$/Si | 70/30 |
| 18 | $K_2SiF_6$/Cu | 70/30 |
| 19 | $K_2SiF_6$/Zn | 70/30 |
| 20 | $K_2SiF_6$/Ge | 70/30 |
| 21 | $K_2SiF_6$/Sr | 70/30 |
| 22 | $K_2SiF_6$/Bi | 70/30 |
| 23 | $K_2SiF_6$/$AlF_3$ | 90/10 |
| 24 | $K_2SiF_6$/LiF | 90/10 |
| 25 | $K_2SiF_6$/CsF | 90/10 |
| 26 | $K_2SiF_6$/KF | 90/10 |
| 27 | $K_2SiF_6$/NaF | 90/10 |
| 28 | $K_2SiF_6$/($KAlF_4$ + $K_3AlF_6$) | 70/30 |
| 29 | $K_2SiF_6$/Cu/Zn | 70/15/15 |
| 30 | $K_2SiF_6$/$SiO_2$ | 70/30 |
| 31 | $K_2SiF_6$/$ZnO_2$ | 70/30 |
| 32 | $K_2SiF_6$/$SiO_2$/$ZnF_2 \cdot 4H_2O$ | 70/15/15 |
| 33 | $K_2SiF_6$/Si/$SiO_2$ | 70/15/15 |
| 34 | $K_2SiF_6$/Si/($KAlF_4$ + $K_3AlF_6$) | 70/15/15 |

TABLE 4

Brazing composition

| No. | Component | Content (wt %) |
|---|---|---|
| 35 | $K_2SiF_6$/Si | 30/70 |
| 36 | $K_2SiF_6$/Cu | 30/70 |
| 37 | $K_2SiF_6$/Zn | 30/70 |
| 38 | $K_2SiF_6$/Ge | 30/70 |
| 39 | $K_2SiF_6$/Sr | 30/70 |
| 40 | $K_2SiF_6$/Bi | 30/70 |
| 41 | $K_2SiF_6$/$AlF_3$ | 40/60 |
| 42 | $K_2SiF_6$/LiF | 40/60 |
| 43 | $K_2SiF_6$/CsF | 40/60 |
| 44 | $K_2SiF_6$/KF | 40/60 |
| 45 | $K_2SiF_6$/NaF | 40/60 |
| 46 | $K_2SiF_6$/($KAlF_4$ + $K_3AlF_6$) | 40/60 |
| 47 | $K_2SiF_6$/Cu/Zn | 30/35/35 |
| 48 | $K_2SiF_6$/$SiO_2$ | 30/70 |
| 49 | $K_2SiF_6$/$ZnO_2$ | 30/70 |
| 50 | $K_2SiF_6$/$SiO_2$/ZnO | 30/35/35 |
| 51 | $K_2SiF_6$/Si/$SiO_2$ | 30/35/35 |

TABLE 5

| No. | Joining rate (%) | Corrosion depth at joint | Maximum fusion depth at non-joint area (μm) | Appearance |
|---|---|---|---|---|
| 17 | 100 | Shallow | 27 | Good |
| 18 | 100 | Shallow | 19 | Good |
| 19 | 100 | Shallow | 34 | Good |
| 20 | 100 | Shallow | 35 | Good |
| 21 | 100 | Shallow | 32 | Good |
| 22 | 100 | Shallow | 25 | Good |
| 23 | 100 | Shallow | 34 | Good |
| 24 | 100 | Shallow | 28 | Good |
| 25 | 100 | Shallow | 24 | Good |
| 26 | 100 | Shallow | 30 | Good |
| 27 | 100 | Shallow | 20 | Good |
| 28 | 100 | Shallow | 27 | Good |
| 29 | 100 | Shallow | 20 | Good |
| 30 | 100 | Shallow | 27 | Good |
| 31 | 100 | Shallow | 20 | Good |
| 32 | 100 | Shallow | 27 | Good |
| 33 | 100 | Shallow | 20 | Good |
| 34 | 100 | Shallow | 27 | Good |

TABLE 6

| No. | Joining rate (%) | Corrosion depth at joint | Maximum fusion depth at non-joint area (μm) | Appearance |
|---|---|---|---|---|
| 35 | 100 | Shallow | 90 | Good |
| 36 | 75 | Excessive corrosion | 150 | Good |
| 37 | 68 | Shallow | 76 | Good |
| 38 | 45 | Excessive corrosion | 71 | Good |
| 39 | 53 | Excessive corrosion | 69 | Good |
| 40 | 47 | Excessive corrosion | 75 | Good |
| 41 | 100 | Shallow | 33 | Great quantity of residue |
| 42 | 100 | Shallow | 29 | Great quantity of residue |
| 43 | 100 | Shallow | 29 | Great quantity of residue |
| 44 | 100 | Shallow | 20 | Great quantity of residue |
| 45 | 100 | Shallow | 22 | Great quantity of residue |
| 46 | 100 | Shallow | 19 | Great quantity of residue |
| 47 | 100 | Excessive corrosion | 40 | Good |
| 48 | 95 | Shallow | 22 | Good |
| 49 | 65 | Shallow | 28 | Great quantity of residue |
| 50 | 88 | Shallow | 30 | Great quantity of residue |
| 51 | 100 | Shallow | 90 | Great quantity of residue |

As is clear from the results shown in Tables 3–6, in Nos. 17–34, in which the brazing composition according to the present invention comprises the first powder comprising at least one or more M—Si—F compounds or hydrates thereof, excellent brazed products were obtained. In Nos. 35–51, in which the brazing compositions comprising a small amount of the first powder were used, the joining rate was low, the joint and the non-joint area exhibited large values for the corrosion depth and the maximum fusion depth, or a great quantity of residue was observed on the surface.

Example 3

Potassium hexafluorosilicate ($K_2SiF_6$) was used as the M—Si—F compound to prepare a powder coating No. 1. Various solvents shown in Table 7 were added to this powder and an acrylic resin comprising n-butyl methacrylate as the major component was added as the resin to prepare coatings Nos. 2–5 in slurry forms. As the $K_2SiF_6$ powder, a powder having an average particle diameter of about 30 μm was used. The solid concentration in the coatings of Nos. 2–5 was adjusted to 60 wt % and the resin concentration was adjusted to 15 wt % of the solid component. The coatings thus prepared were applied to aluminum sheets similar to those used in Example 1 using the application methods shown in Table 7 so that the Si-reduced coating weight was about 10 g/m². The brazing properties of the aluminum sheets were evaluated in the same manner as in Example 1.

The results are shown in Table 8. As is clear from the results shown in Table 8, brazed products exhibiting superior properties were obtained when using the coatings Nos. 1–5.

TABLE 7

| Coating No. | Brazing composition | Solvent | Blend of resin | Application to Aluminum sheet |
|---|---|---|---|---|
| 1 | $K_2SiF_6$ | | None | Powder coating |
| 2 | $K_2SiF_6$ | Water | Blended | Brush coating |
| 3 | $K_2SiF_6$ | 2-propanol | Blended | Brush coating |
| 4 | $K_2SiF_6$ | Xylene | Blended | Brush coating |
| 5 | $K_2SiF_6$ | Xylene | Blended | Roll transfer coating |

TABLE 8

| Coating No. | Corrosion depth at joint | Size of fillet | Joining rate (%) | Maximum fusion depth at non-joint area (μm) | Appearance |
|---|---|---|---|---|---|
| 1 | Shallow | Medium | 100 | 30 | Good |
| 2 | Shallow | Medium | 100 | 29 | Good |
| 3 | Shallow | Medium | 100 | 25 | Good |
| 4 | Shallow | Medium | 100 | 24 | Good |
| 5 | Shallow | Medium | 100 | 22 | Good |

As is clear from the above explanations, since the brazing composition of the present invention can remove the oxide film from the surfaces of the aluminum materials to be joined at a temperature lower than the melting point of the aluminum materials and can form a eutectic aluminum alloy braze which fuses at such a low temperature by reaction with the aluminum materials, there is no need to use either a brazing sheet or a mixture of a brazing material and flux as in a conventional method. If a powder having a large particle size is used, since local fusion is effectively controlled, a solid brazed joint exhibiting little local fusion can be obtained. Because of this, the cost for the materials as well as the manufacturing cost can be reduced due to the simple manufacturing process. An aluminum material for brazing is easily prepared by using the brazing coating prepared from the brazing composition of the present invention. A solid brazed product exhibiting little local fusion can be obtained by applying the brazing composition to the joined surfaces of the aluminum materials of the present invention and the like and heating these aluminum materials to braze them.

Obviously, numerous modifications and variations of the present invention are possible in light of the above teachings. It is therefore to be understood that, within the scope of the appended claims, the invention may be practiced other than as specifically described herein.

What is claimed is:

1. A brazing composition for aluminum materials which has the function of removing an oxide film and forming a eutectic aluminum alloy braze which fuses by reaction with the aluminum materials at a temperature lower than the melting point of the aluminum materials and consisting essentially of a powder consisting essentially of one or more M—Si—F compounds, or hydrates thereof, wherein M is at least one member selected from the group consisting of hydrogen and an alkaline metal.

2. The brazing composition for aluminum materials according to claim 1, wherein the M—Si—F compound is hexafluorosilicic acid or an alkaline metal salt thereof.

3. The brazing composition for aluminum materials according to claim 1, wherein the M—Si—F compound is potassium hexafluorosilicate or sodium hexafluorosilicate.

4. A brazing coating prepared by dispersing the brazing composition of the claim 1 in a volatile solvent or water in slurry form.

5. A brazing coating prepared by dispersing the brazing composition of the claim 1 in a volatile solvent or water in slurry form, further comprising a resin which disperses and disappears at 550° C. or lower and does not hinder brazing properties.

6. The brazing composition for aluminum materials according to claim 1, wherein the weight ratio of M:Si:F is 5–50%:5–50%:20–80% in the one or more M—Si—F compounds, with the sum of M, Si and F being 100%.

7. A brazing composition for aluminum materials which has the function of removing an oxide film and forming a eutectic aluminum alloy braze which fuses by reaction with the aluminum materials at a temperature lower than the melting point of the aluminum materials and comprising a powder which comprises one or more M—Si—F compounds, or hydrates thereof, wherein M is at least one member selected from the group consisting of hydrogen and an alkaline metal and the weight ratio of M:Si:F is 5–50%:5–50%:20–80% in the one or more M—Si—F compounds, with the sum of M, Si and F being 100%.

8. The brazing composition for aluminum materials according to claim 5, wherein the alkaline metal salt of the hexafluorosilicic acid is potassium hexafluorosilicate or sodium hexafluorosilicate.

9. A brazing composition for aluminum materials which has the functions of removing an oxide film and forming a eutectic aluminum alloy braze which fuses by reaction with the aluminum materials at a temperature lower than the melting point of the aluminum materials and comprising a first powder comprising 50 wt. % or more of at least one of hexafluorosilicic acid, an alkaline metal salt thereof and a hydrate thereof, and second powders of at least one powder selected from the group consisting of (A)–(H): (A) at least one of Al, Si, Cu, Zn, Ge, Sr and Bi metal powders; (B) alloy powders of Al with at least one of Si, Cu, Zn, Ge, Sr and Bi; (C) oxide powders of at least one of Al, Si, Cu, Zn, Ge, Sr and Bi; (D) fluoride powders of at least one of Si, Cu, Zn, Ge, Sr and Bi; (E) alkaline metal salts of silicic acid; (F) hydrates of alkaline metal salts of silicic acid; (G) hexafluorosilicates that are not alkaline metal salts; and (H) hydrates of hexafluorosilicates that are not alkaline metal salts.

* * * * *